(12) United States Patent (10) Patent No.: US 12,676,516 B2
Zhao et al. (45) Date of Patent: Jul. 7, 2026

(54) MOTOR AND ASSEMBLY STRUCTURE THEREOF

(71) Applicant: FOSHAN WELLING WASHER MOTOR MANUFACTURING CO., LTD., Foshan (CN)

(72) Inventors: Yunsheng Zhao, Foshan (CN); Bingchun Guo, Foshan (CN); Linwei Zhou, Foshan (CN)

(73) Assignee: FOSHAN WELLING WASHER MOTOR MANUFACTURING CO., LTD., Foshan (CN)

( * ) Notice: Subject to any disclaimer, the term of this patent is extended or adjusted under 35 U.S.C. 154(b) by 668 days.

(21) Appl. No.: 17/704,350

(22) Filed: Mar. 25, 2022

(65) Prior Publication Data

US 2022/0216745 A1 Jul. 7, 2022

Related U.S. Application Data

(63) Continuation of application No. PCT/CN2019/129154, filed on Dec. 27, 2019.

(30) Foreign Application Priority Data

Oct. 25, 2019 (CN) ........................ 201911025229.X

(51) Int. Cl.
 *H02K 1/18* (2006.01)
 *H02K 5/16* (2006.01)
 *H02K 15/02* (2025.01)
(52) U.S. Cl.
 CPC .............. *H02K 1/185* (2013.01); *H02K 5/16* (2013.01); *H02K 15/02* (2013.01); *H02K 2213/03* (2013.01)

(58) Field of Classification Search
 CPC ............ H02K 1/06; H02K 1/14; H02K 1/146; H02K 1/148; H02K 1/141; H02K 1/16;
 (Continued)

(56) References Cited

U.S. PATENT DOCUMENTS 6,131,268 A * 10/2000 Neuenschwander ........................
 H02K 15/024
 310/217
6,492,742 B1 * 12/2002 Fujikawa ............... H02K 11/00
 290/40 C
 (Continued)

FOREIGN PATENT DOCUMENTS

CN 201226480 Y 4/2009
CN 201674284 U * 12/2010 ............... H02K 1/14
 (Continued)

OTHER PUBLICATIONS

17704350_2024-02-28_CN_201674284_U_H.pdf (Year: 2024).*
 (Continued)

*Primary Examiner* — Christopher M Koehler
*Assistant Examiner* — Ahmed F Seck
(74) *Attorney, Agent, or Firm* — Scully, Scott, Murphy & Presser, P.C.

(57) ABSTRACT

A motor assembly structure and a motor are provided. The motor assembly structure has a stator, a first end cap, a second end cap and a fastener for fastening the stator, the first end cap and the second end cap. The stator has a middle iron core, a first side iron core and a second side iron core. The inner edge of the first end cap is provided with a first inner arc surface, the outer edge of the first side iron core is provided with a first outer arc surface in interference fit with the first inner arc surface. The inner edge of the second end cap is provided with a second inner arc surface, and the outer edge of the second side iron core is provided with a second
 (Continued)

outer arc surface in clearance fit with the second inner arc surface.

20 Claims, 7 Drawing Sheets

(58) Field of Classification Search
CPC ............ H02K 1/18; H02K 1/185; H02K 5/00;
H02K 5/02; H02K 5/04; H02K 5/15;
H02K 5/16; H02K 5/24; H02K 5/26;
H02K 5/161; H02K 5/173; H02K 5/1732;
H02K 15/02; H02K 15/024; H02K 15/16;
H02K 2213/00; H02K 2213/03; H02K
11/00; H02K 3/34
See application file for complete search history.

(56)                   References Cited

U.S. PATENT DOCUMENTS

| | | | | |
|---|---|---|---|---|
| 2003/0020357 A1* | 1/2003 | Harada | .................... | H02K 1/16 |
| 2007/0085441 A1* | 4/2007 | Kao | ......................... | H02K 1/16 |
| | | | | 310/216.016 |
| 2009/0001843 A1* | 1/2009 | Enomoto | ............... | H02K 1/145 |
| | | | | 310/257 |
| 2009/0115282 A1* | 5/2009 | Nishidate | ............... | H02K 1/146 |
| | | | | 180/65.245 |
| 2013/0175896 A1* | 7/2013 | Yabe | ................... | F04C 29/0085 |
| | | | | 310/211 |
| 2014/0132122 A1 | 5/2014 | Furukawa et al. | | |
| 2014/0265715 A1* | 9/2014 | Huggins | .................. | H02K 1/12 |
| | | | | 310/216.052 |
| 2016/0164390 A1* | 6/2016 | Furukawa | .............. | H02K 35/00 |
| 2019/0131829 A1* | 5/2019 | Hino | ........................ | H02K 1/16 |

FOREIGN PATENT DOCUMENTS

| | | | | | |
|---|---|---|---|---|---|
| CN | 203911705 U | | 10/2014 | | |
| CN | 105024464 A | | 11/2015 | | |
| CN | 106300853 A | * | 1/2017 | ............... | H02K 1/16 |
| CN | 106532999 A | * | 3/2017 | ............ | H02K 1/146 |
| CN | 109962584 A | | 7/2019 | | |
| CN | 209329862 U | | 8/2019 | | |
| DE | 102010062822 A1 | | 6/2012 | | |
| JP | H421334 A | | 1/1992 | | |
| JP | 2001251806 A | * | 9/2001 | | |
| JP | 2008187880 A | | 8/2008 | | |
| JP | 2013046486 A | | 3/2013 | | |
| KR | 101888644 B1 | | 8/2018 | | |
| WO | WO 2016189244 A1 | * | 12/2016 | ............... | H02K 1/16 |

OTHER PUBLICATIONS

17704350_2024-02-28_CN_106300853_A_H.pdf (Year: 2024).*
17704350_2024-02-28_CN_106532999_A_H.pdf (Year: 2024).*
17704350_2024-02-28_WO_2016189244_A1_H.pdf (Year: 2024).*
17704350_2025-05-30_JP_2001251806_A_H.pdf (Year: 2025).*
Request for the Submission of an Opinion dated Aug. 1, 2023 received in Korean Patent Application No. KR 10-2022-7009347.
International Search Report dated Jul. 16, 2020 issued in PCT/CN2019/129154.
Written Opinion dated Jul. 16, 2020 issued in PCT/CN2019/129154.
Extended European Search Report dated Oct. 5, 2022 received in European Patent Application No. EP 19950008.3.
Notice of Reasons for Refusal dated Mar. 28, 2023 received in Japanese Patent Application No. JP 2022-516714.
First Office Opinion notice dated Apr. 21, 2025 received in Chinese Patent Application No. 202210296600.1.
First Office Opinion notice dated Apr. 21, 2025 received in Chinese Patent Application No. 202210296607.3.
Office Action dated Apr. 1, 2025 received in European Patent Application No. 19 950 008.3.

* cited by examiner

MOTOR AND ASSEMBLY STRUCTURE THEREOF

CROSS-REFERENCE TO RELATED APPLICATIONS

The present application is a continuation application of PCT International Application No. PCT/CN2019/129154, filed on Dec. 27, 2019, which claims priority to and benefits of Chinese Application No. 201911025229.X, filed on Oct. 25, 2019 to China National Intellectual Property Administration and entitled "MOTOR AND ASSEMBLY STRUCTURE THEREOF," the entire contents of which are incorporated herein by reference for all purposes. No new matter has been introduced.

FIELD

The present application belongs to the field of motor technologies, and more particularly, relates to a motor and an assembly structure thereof.

BACKGROUND

In the field of motors, considering a manufacturing cost, an assembly mode of clearance fit of a stator, a front end cap and a rear end cap is generally used in a single-phase asynchronous motor and other motors, and this assembly mode leads to a low coaxiality of the stator, the end caps and the rotor. Moreover, in this assembly mode, there are a large air gap between the rotor and the stator, a large consumption amount of silicon steel and enameled wire used by the stator and the rotor, and a low utilization rate of materials, so that it is necessary to use electromagnetic materials of a larger volume to reach an output power, which leads to a higher electromagnetic cost.

SUMMARY

The present application aims to provide a motor assembly structure, and aims at solving at least the technical problems of a low coaxiality of a stator and a rotor and a large air gap between the stator and the rotor in the prior art.

The present application provides a motor assembly structure. The motor assembly structure includes a stator, a first end cap and a second end cap which are respectively arranged on two sides of the stator, and a fastener for fastening the stator, the first end cap and the second end cap. The stator includes a middle iron core, a first side iron core facing the first end cap and a second side iron core facing the second end cap. The first end cap has an inner edge with a first inner arc surface, and the first side iron core has an outer edge with a first outer arc surface in an interference fit with the first inner arc surface. The second end cap has an inner edge with a second inner arc surface, and the second side iron core has an outer edge with a second outer arc surface in a clearance fit with the second inner arc surface.

In an embodiment, the first side iron core has a thickness h1, the second side iron core has a thickness h3, and h1≥5 mm, h1≥h3.

In an embodiment, the first inner arc surface has a depth L1 along an axial direction of the first inner arc surface, and L1≥5 mm.

In an embodiment, the middle iron core is polygonal, the first side iron core is provided with the first outer arc surface, and the second side iron core is provided with the second outer arc surface.

In an embodiment, a circle center of the first outer arc surface coincides with a center of the first side iron core, and a circle center of the second outer arc surface coincides with a center of the second side iron core.

In an embodiment, a distance between two sides of the first side iron core is a1, the first outer arc surface has a diameter d1, and (a1/cos 20°)≥d1>a1.

In an embodiment, a distance between two sides of the second side iron core is a1, and the second outer arc surface has a diameter d3.

In an embodiment, a distance between two sides of the middle iron core is a2, and a1=a2.

In an embodiment, the first end cap is provided with a plurality of first mounting holes at an edge of the first end cap, the middle iron core is provided with a plurality of second mounting holes at each edge of the middle iron core, and the second end cap is provided with a third mounting hole at an edge of the second end cap. The fastener extends through the first mounting holes, the second mounting holes and the third mounting hole. The second mounting holes are circumferentially distributed around a circle center of the middle iron core.

In an embodiment, the first end cap is provided with a first flange contacted to a surface of the middle iron core, the second end cap is provided with a second flange contacted to a surface of the middle iron core, the first mounting holes are formed in the first flange, and the second mounting holes are formed in the second flange.

In an embodiment, a distance from a circle center of the second mounting hole to the center of the middle iron core is 0.5D3, the first outer arc surface has a diameter d1, and (D3−d1)≥18 mm.

In an embodiment, the middle iron core is provided with a third outer arc surface at each corner of the middle iron core, a circle center of the third outer arc surface coincides with the center of the middle iron core, the third outer arc surface has a diameter d2, the second mounting holes has a diameter D2, and a distance from a circle center of the second mounting holes to the center of the middle iron core is 0.5D3, and d2−(D2+D3)≥2.2 mm.

In an embodiment, the middle iron core is provided with a chamfer at each corner of the middle iron core, a distance between two chamfer tangent lines at opposite corners of the middle iron core is d2, the second mounting holes has a diameter D2, and a distance from a circle center of the second mounting hole to the center of the middle iron core is 0.5D3, and d2−(D2+D3)≥2.2 mm.

In an embodiment, the first inner arc surface has a depth L1 along an axial direction of the first inner arc surface, the first inner arc surface has a diameter D4, and the first outer arc surface has a diameter d1, the first side iron core has a thickness h1, D4=d1, and L1−h1≥10 mm.

In an embodiment, a joint between the first flange and the first inner arc surface is provided with a rounded chamfer having a radius R1, and R1≤2 mm.

In an embodiment, the second inner arc surface has a depth L2 along an axial direction of the second inner arc surface, the second inner arc surface has a diameter D5, and the second outer arc surface has a diameter d3, the second side iron core has a thickness h1, D5=d3, and L2−h3≥10 mm.

In an embodiment, a joint between the second flange and the second inner arc surface is provided with a chamfer C having an axial depth less than or equal to 1 mm.

In an embodiment, the first end cap is provided with a first bearing chamber at a side of the first end cap far away from the stator, the second end cap is provided with a second bearing chamber at a side of the second end cap far away from the stator, and the first bearing chamber, the second bearing chamber and an inner circular surface of the stator are coaxially arranged.

In an embodiment, the first side iron core, the middle iron core and the second side iron core are made with slices laminated.

In an embodiment, the first inner arc surface of the first end cap is in an interference fit with the first outer arc surface of the stator by a press-in method or a temperature difference method.

In an embodiment, the present application further provides a motor, including the motor assembly structure above, and in some embodiments including a rotor, and a first bearing and a second bearing which are arranged at two ends of the rotor respectively, where the first bearing is arranged in the first end cap and the second bearing is arranged in the second end cap.

The motor assembly structure provided by the present application has the beneficial effects that: the motor assembly structure of the present application includes the stator, the first end cap, the second end cap, and the fastener for fastening the stator, the first end cap and the second end cap above, where the stator includes the middle iron core, and the first side iron core and the second side iron core which are respectively arranged on two sides of the middle iron core. The first side iron core is provided with the first outer arc surface, the first end cap is provided with the first inner arc surface, and the first inner arc surface is in an interference fit with the first outer arc surface; the second side iron core is provided with the second outer arc surface, the second end cap is provided with the second inner arc surface, and the second inner arc surface is in a clearance fit with the second outer arc surface; and in this way, the coaxiality of the stator and the end caps can be effectively improved by positioning fit between the first side iron core and the first end cap and positioning fit between the second side iron core and the second end cap, and thus the coaxiality of the stator and the rotor is improved and the air gap between the rotor and the stator is reduced.

BRIEF DESCRIPTION OF THE DRAWINGS

In order to illustrate the technical solutions in the embodiments of the present application, the drawings which need to be used in describing the embodiments or the prior art will be briefly introduced hereinafter. Apparently, the drawings described hereinafter are only some embodiments of the present application, those of ordinary skills in the art may obtain other drawings according to these drawings without going through any creative work.

Figure 1:
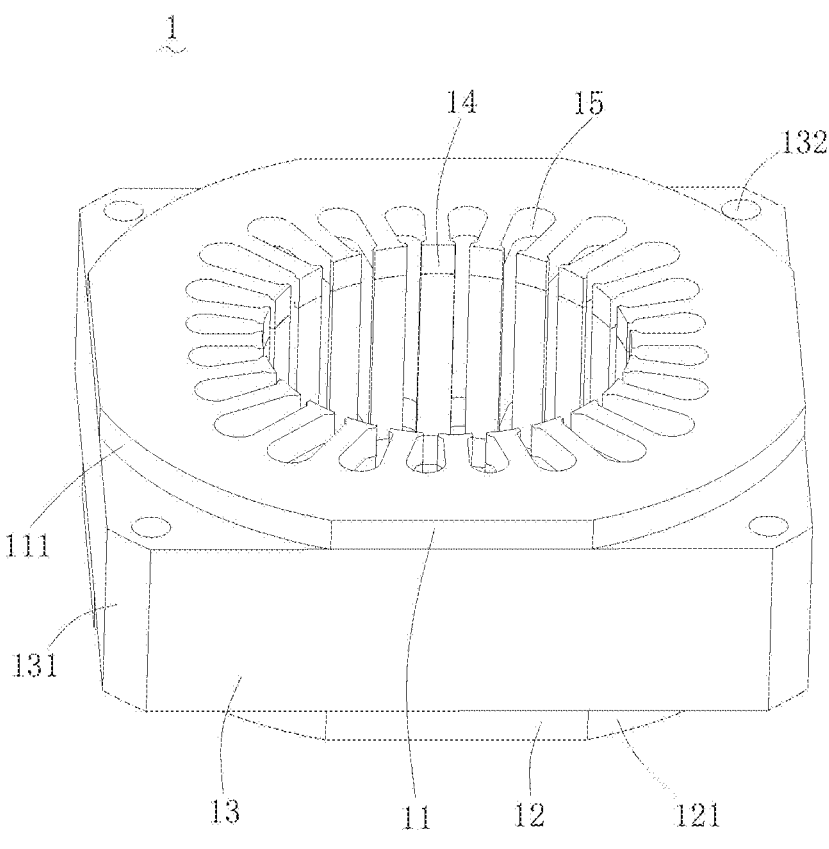
FIG. 1 is a stereoscopic structural diagram of a stator according to an embodiment of the present application.

Reference numerals in the drawings are described as follows:

1 refers to stator; 11 refers to first side iron core; 111 refers to first outer arc surface; 12 refers to second side iron core; 121 refers to second outer arc surface; 13 refers to middle iron core; 131 refers to third outer arc surface; 132 refers to second mounting hole; 14 refers to inner circular surface; 15 refers to groove type; 2 refers to first end cap; 21 refers to first inner arc surface; 22 refers to first flange; 23 refers to first bearing chamber; 24 refers to first mounting hole; 3 refers to second end cap; 31 refers to second inner arc surface; 32 refers to second flange; 33 refers to second bearing chamber; 34 refers to third mounting hole; 4 refers to fastener; 5 refers to rotor; 6 refers to first bearing; and 7 refers to second bearing.

DETAILED DESCRIPTION OF EMBODIMENTS

To make the technical problems to be solved in the present application, the technical solutions and the beneficial effects clearer, the present application is further described in detail hereinafter with reference to the accompanying drawings and the embodiments. It should be understood that the specific embodiments described herein are only used for explaining the present application and are not intended to limit the present application.

It should be noted that when an element is expressed to be "fixed" or "arranged" on another element, it may be directly or indirectly on another element. When one element is referred to being "connected" to another element, it may be directly or indirectly connected to another element.

It should be understood that any orientation/position related description, such as the orientational or positional relationship, such as, "length", "width", "up", "down", "front", "rear", "left", "right", "vertical", "horizontal", "top", "bottom", "inner", "outer", and the like, is based on the orientational or positional relationship shown in the accompanying drawings for the purpose of facilitating the description of the present application and simplifying the description, and does not indicate or imply that the device or element must have a specific orientation or position, or is constructed and operated in a specific orientation or position, and therefore shall not be understood as a limitation to the present application.

Moreover, the terms, such as "first", "second", and the like, are used for descriptive purposes only, and cannot be understood as indicating or implying relative importance, or implicitly indicating the number of technical features indicated thereby. Therefore, the feature defined by "first" and "second" may explicitly or implicitly include one or more of the features. In the description of the present application, "a plurality of" means two or more than two, unless otherwise specifically defined.

Figure 2:
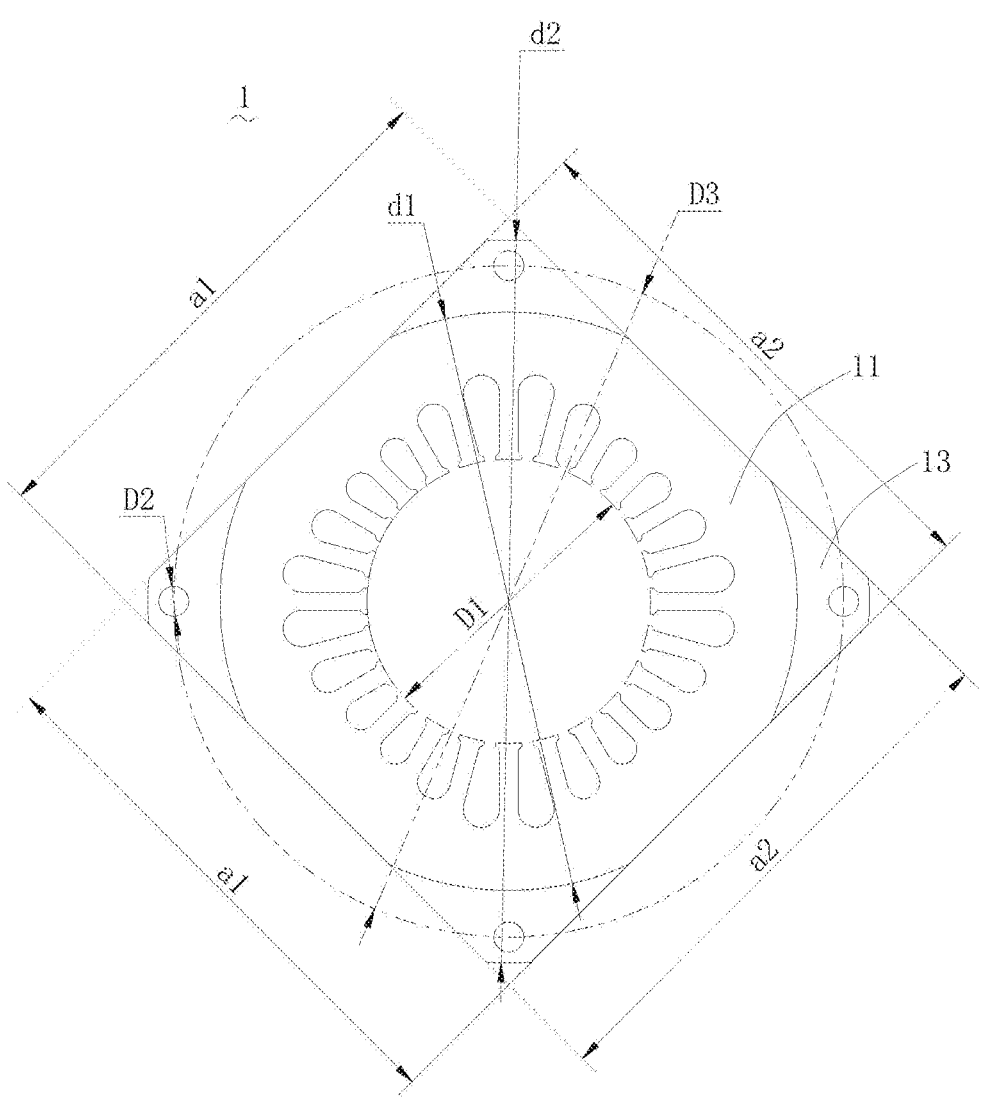
FIG. 2 is a first front view of the stator according to an embodiment of the present application.
Figure 3:
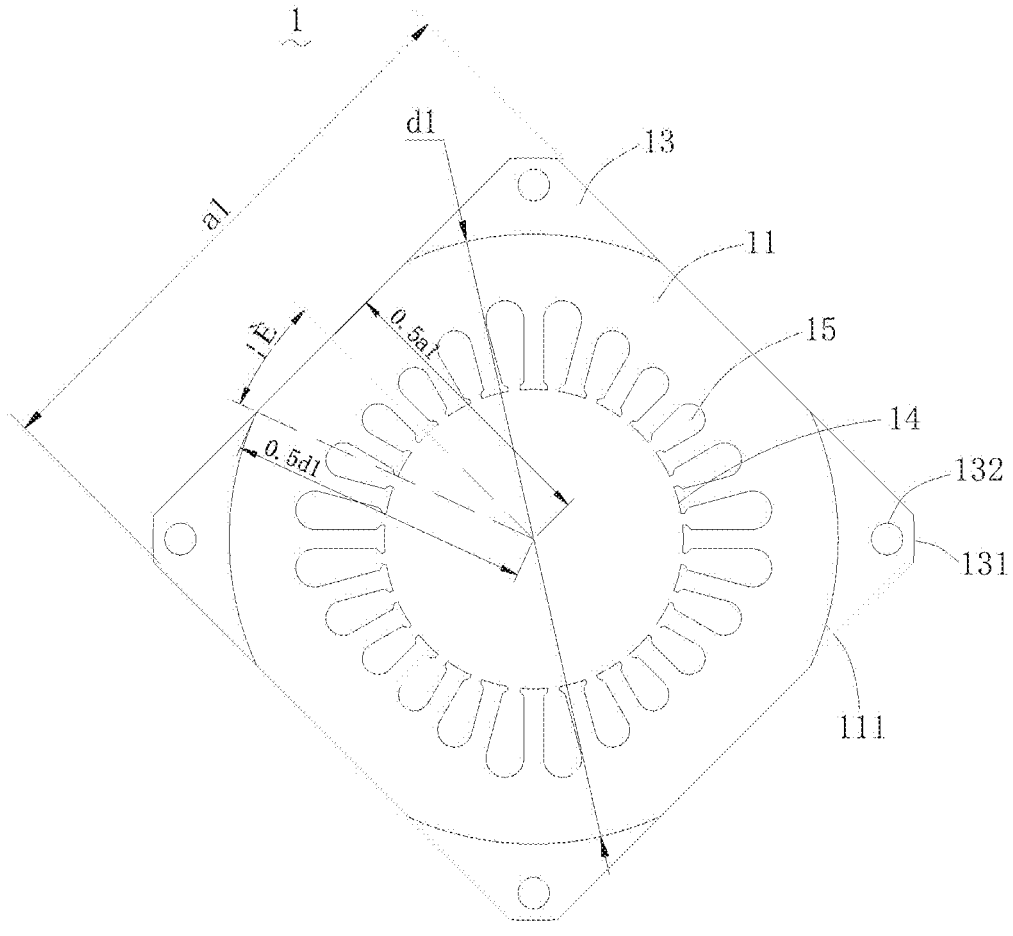
FIG. 3 is a second front view of the stator according to an embodiment of the present application.

With reference to FIG. 1 to FIG. 3, a motor assembly structure provided by an embodiment of the present application is now described. In one of embodiments of the motor assembly structure, the motor assembly structure includes a stator 1, a first end cap 2, a second end cap 3, and a fastener 4. The stator 1 includes a first side iron core 11, a second side iron core 12 and a middle iron core 13, and the first side iron core 11 and the second side iron core 12 are respectively arranged on two sides of the middle iron core 13. The first end cap 2 is in an interference fit with the first side iron core 11, and the second end cap 3 is in a clearance fit with the second side iron core 12. In some embodiments, the first end cap 2 has an inner edge with a first inner arc surface 21, the first side iron core 11 has an outer edge with a first outer arc surface 111, and the first inner arc surface 21 is in an interference fit with the first outer arc surface 111, so that the first end cap 2 is in an interference fit with the stator 1. The second end cap 3 has an inner edge with a second inner arc surface 31, the second side iron core 12 has an outer edge with a second outer arc surface 121, and the second inner arc surface 31 is in a clearance fit with the second outer arc surface 121, so that the second end cap 3 is in a clearance fit with the stator 1. Cooperation of the first outer arc surface 111 and the first inner arc surface 21 has a radial positioning effect on the first end cap 2, which improves the coaxiality of the stator 1 and the first end cap. Cooperation of the second outer arc surface 121 and the second inner arc surface 31 facilitates assembly of the second end cap 3 and the stator. The first end cap 2 and the second end cap 3 are both internally provided with a bearing chamber, and the coaxiality of the stator 1, the first end cap 2 and the second end cap 3 is improved, so that the coaxiality of the stator 1 and bearings is improved, and in an embodiment, the coaxiality of the stator 1 and the rotor 5 is improved, and thus a relatively stable output power is ensured. The cooperation of the first outer arc surface 111 and the first inner arc surface 21 and the cooperation of the second outer arc surface 121 and the second inner arc surface 31 enable front and rear sides of the stator 1 to be respectively embedded into the second end cap 3 and the first end cap 2, so that the coaxiality of the stator 1 and the rotor 5 is ensured, an air gap between the rotor 5 and the stator 1 can be reduced, a magnetic resistance of a motor is reduced, and a higher output efficiency can be achieved under electromagnetic materials of a same volume, and thus an electromagnetic utilization ratio is improved.

The motor assembly structure in the embodiment above includes the stator 1, the first end cap 2, the second end cap 3, and the fastener 4 for fastening the stator, the first end cap and the second end cap above. The stator 1 includes the middle iron core 13, and the first side iron core 11 and the second side iron core 12 that are respectively arranged on two sides of the middle iron core 13. The first side iron core 11 is provided with the first outer arc surface 111, the first end cap 2 is provided with the first inner arc surface 21, and the first inner arc surface 21 is positioned in an interference fit with the first outer arc surface 111. The second side iron core 12 is provided with the second outer arc surface 121, the second end cap 3 is provided with the second inner arc surface 31, and the second inner arc surface 31 is positioned in a clearance fit with the second outer arc surface 121. In this way, the coaxiality of the stator 1 and the end caps can be effectively improved by positioning fit between the first side iron core 11 and the first end cap 2 and positioning fit between the second side iron core 12 and the second end cap 3. Thus, the coaxiality of the stator 1 and the rotor 5 is improved and the air gap between the rotor 5 and the stator 1 is reduced.

Figure 4:
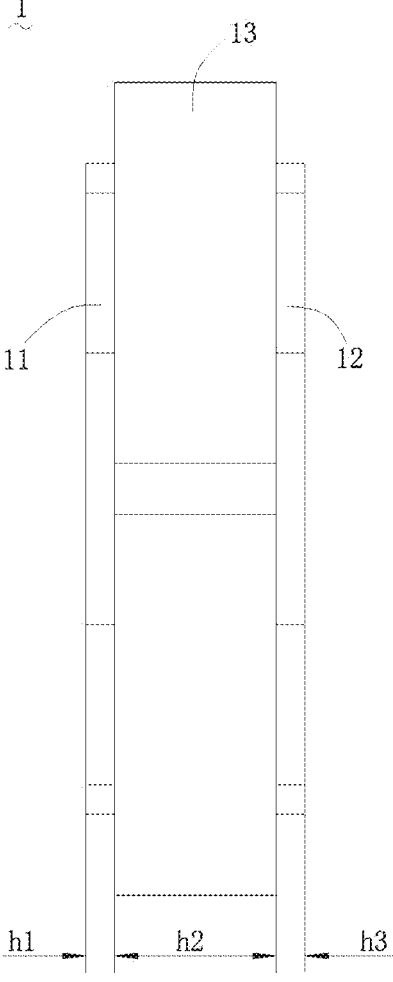
FIG. 4 is a left view of the stator according to an embodiment of the present application.

With reference to FIG. 4, in one of embodiments of the stator 1, the first side iron core 11 has a thickness h1, the middle iron core 13 has a thickness h2, and the second side iron core has a thickness h3. Due to the cooperation between the first outer arc surface 111 of the first side iron core 11 and the first inner arc surface 21 of the first end cap 2 and the cooperation between the second outer arc surface 121 of the second side iron core 12 and the second inner arc surface 31 of the second end cap 3, the first side iron core 11 has a maximum depth h1 extending into the first end cap 2, and the second side iron core 12 has a maximum depth h3 extending into the second end cap 3. In a condition that h1 and h3 are overly small, the first end cap 2 may also fall off from the stator 1 even if being in an interference fit with the first side iron core 11, resulting in unstable connection of the interference fit between the first end cap and the first side iron core, and the second end cap 3 is also prone to shaking radially relative to the second side iron core 12, resulting in poor assembly and low assembly accuracy. In order to prevent the first end cap 2 from falling off, h1≥5 mm. The first end cap 2 is a cap body formed by stretching, and a bending portion of the first end cap 2 is arc-shaped, which can reduce a fitting thickness of the first end cap 2 and the first side iron core 11, while the second end cap 3 is a cap body formed by die-casting, and a diameter of an arc at a bending portion of the second end cap is small, where the bending portion may even be 90 degrees, such that a fitting thickness of the second end cap 3 and the second side iron core 12 wouldn't be reduced, and h1≥h3.

In an embodiment, the first inner arc surface 21 has a depth L1 along an axial direction of the first inner arc surface, and L1≥5 mm, so that an effective fitting thickness of the first end cap 2 and the first side iron core 11 is ensured, and a reliability of interference fit between the first end cap 2 and the first side iron core 11 is improved.

With reference to FIG. 1 to FIG. 3, in one of embodiments of the stator 1, the first side iron core 11 is provided with the first outer arc surface 111, and the second side iron core 12 is provided with the second outer arc surface 121. In an embodiment, the first side iron core 11, the middle iron core 13 and the second side iron core 12 are polygonal, such as, rectangular. The first outer arc surface 111 is arranged at a corner of the first side iron core 11, and only the corner of the first side iron core 11 is fit with the first end cap 2. The second outer arc surface 121 is arranged at a corner of the second side iron core 12, and only the corner of the second side iron core 12 is in a clearance fit with the second end cap 3. The larger the two fitting areas are, the greater the coaxial positioning effect of the first side iron core 11 on the first end cap 2 and the coaxial positioning effect of the second side iron core 12 on the second end cap 3 are. However, when the two fitting areas are overly large, which means that with the areas of the first outer arc surface 111 and the second outer arc surface 121 becoming larger, materials of the stator would be reduced, and an electromagnetic performance would be lowered. Therefore, the areas of the first outer arc surface 111 and the second outer arc surface 121 should be selected considering a motor performance and an assembly performance.

In an embodiment, the first side iron core 11 and the second side iron core 12 are both square, a circle center of the first outer arc surface 111 coincides with a center of the first side iron core 11, and a circle center of the second outer arc surface 121 coincides with a center of the second side iron core 12. Four first outer arc surfaces 111 form a circumscribed tangent circle of the first side iron core 11, so that a circle center of the circumscribed tangent circle coincides with the circle center of the first outer arc surface 111, and thus the stator 1 and the first end cap 2 are coaxial during assembly. Four second outer arc surfaces 121 form a circumscribed tangent circle of the second side iron core 12, so that a circle center of the circumscribed tangent circle coincides with the circle center of the second outer arc surface 121, and thus the stator 1 and the second end cap 3 are coaxial during assembly.

With reference to FIG. 3, in one of embodiments of the stator 1, the circle center of the first outer arc surface 111 coincides with the center of the first side iron core 11, a distance between two sides of the first side iron core 11 is a1, the first outer arc surface 111 has a diameter d1, and (a1/cos 20°)≥d1>a1. The diameter d1 corresponds to the circumscribed tangent circle of the first side iron core 11, and the diameter d1 of the circumscribed tangent circle is greater than the side length a1, which means that d1>a1. In FIG. 3, cos θ=(0.5a1)/(0.5d1), where the smaller the θ is, the smaller the d1 is. When more materials are cut, the electromagnetic performance is lowered, and a performance of the stator 1 of the motor is worse, so that a performance of the motor may be affected in the case that d1 is overly small. However, in a case that d1 is overly large, the area of the first outer arc surface 111 may be overly small and the area between the stator 1 and the first end cap 2 for fitting cannot be ensured. Therefore, a1/d1≥cos 20°, and θ is 20° at the maximum, so that the fitting area between the stator 1 and the first end cap 2 is ensured, and thus the coaxiality is ensured.

Figure 6:
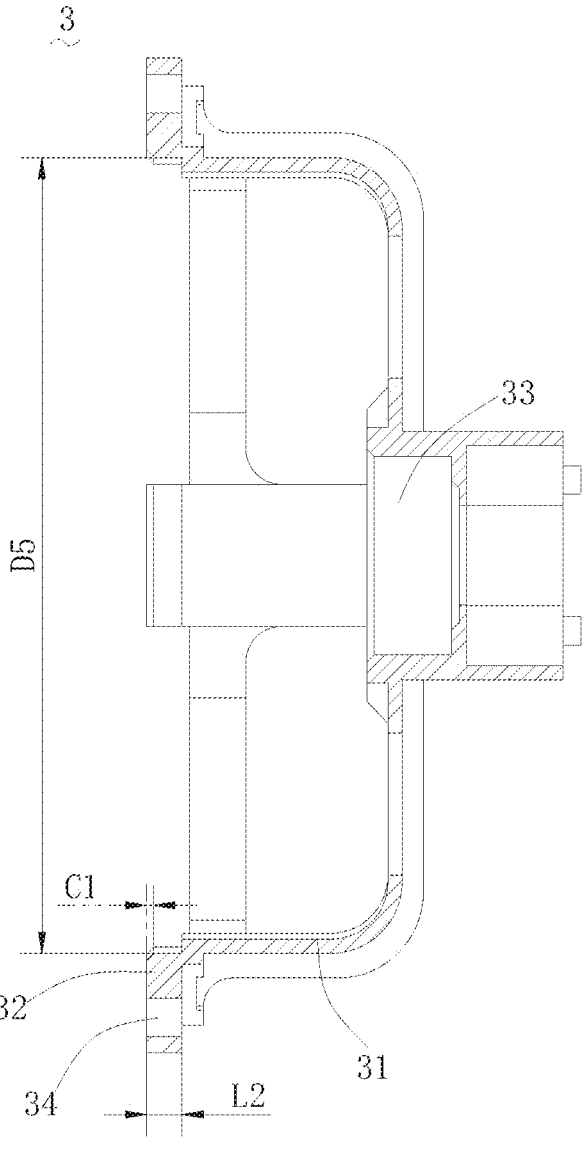
FIG. 6 is a cross-sectional view of a second end cap according to an embodiment of the present application.
Figure 7:
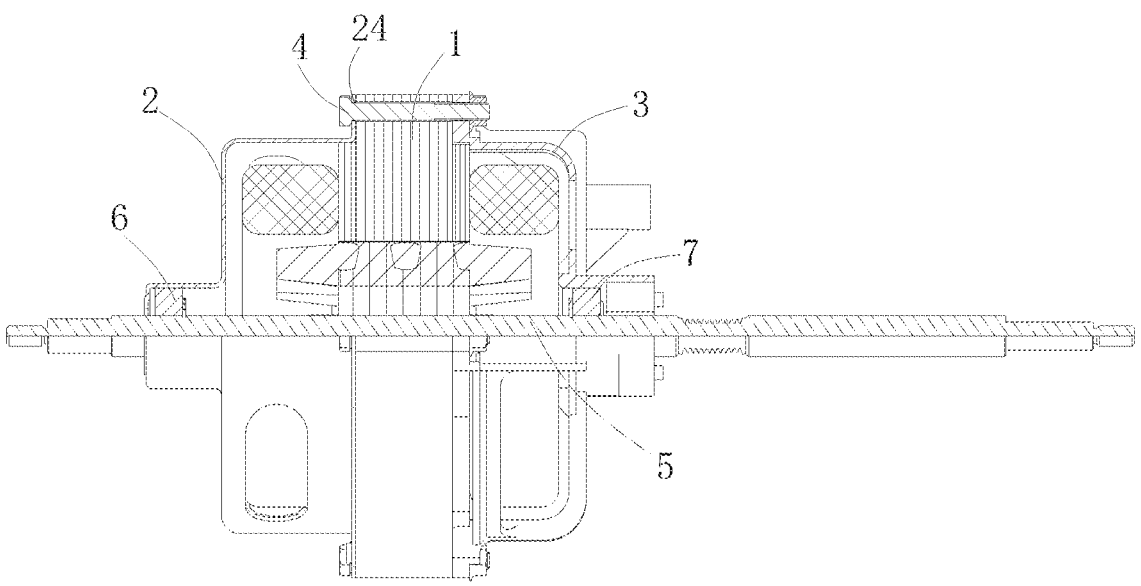
FIG. 7 is a semi-cross-sectional view of a motor according to an embodiment of the present application.

In an embodiment, the first side iron core 11 and the second side iron core 12 have a same structure and size, and a distance between two sides of the second side iron core 12 is a1, for example, when the first side iron core 11 and the second side iron core 12 are both square, the first side iron core and the second side iron core have an equal length of sides. The second outer arc surface 121 has a diameter d3, and (a1/cos 20°)≥d3>a1. With reference to FIG. 6 and FIG. 7, in one of embodiments of the motor assembly structure, the first end cap 2 is provided with a plurality of first mounting holes 24 at an edge of the first end cap 2, the middle iron core is provided with a plurality of second mounting holes 132 at each edge of the middle iron core, the second end cap 3 is provided with a third mounting hole 34 at an edge of the second end cap 3, and the fastener 4 extends through the first mounting hole 24, the second mounting hole 132 and the third mounting hole 34.

In an embodiment, the middle iron core 13, the first side iron core 11 and the second side iron core 12 are all square, a side length of the middle iron core 13 is a2, and a1=a2, so that the middle iron core 13, the first side iron core 11 and the second side iron core 12 have an equal length of sides, and thus a side face of an uncut circle of the stator 1 is a flat surface.

The middle iron core 13, the first side iron core 11 and the second side iron core 12 are all provided with an inner circular surface 14 for the rotor 5 to extend through, and also provided with a groove type 15. Structures and sizes of the inner circular surfaces 14 and the groove types 15 of the middle iron core, the first side iron core and the second side iron core above are the same. The first side iron core 11, the middle iron core 13 and the second side iron core 12 may be made with slices laminated, and each slice is provided with the inner circular surface 14 and the groove type 15. The inner circular surfaces 14 are aligned with each other, and the groove types 15 are aligned with each other. The first end cap 2 and the second end cap 3 are both internally provided with a bearing chamber for mounting a bearing, and the bearings are used for supporting the rotor 5. The bearing chamber in the first end cap 2 is a first bearing chamber 23, and the bearing chamber in the second end cap 3 is a second bearing chamber 33. The first bearing chamber 23, the second bearing chamber 33 and the inner circular surface 14 of the stator 1 are coaxially arranged.

The steps for assembling the first end cap 2 and the second end cap 3 are as follows: firstly, the first end cap 2 and the first side iron core 11 are connected in an interference fit, the first mounting holes 24 are aligned with the second mounting holes 132, and the first inner arc surface 21 and the first outer arc surface 111 are attached to each other, so as to improve the coaxiality of the first bearing chamber 23 of the first end cap 2 and the inner circular surface 14 of the stator 1, so that the first end cap 2 is fastened to the stator 1; subsequently, the second end cap 3 is in a clearance fit with the second side iron core 12 at normal temperature, the third mounting hole 34 is aligned with the second mounting holes 132, and the second inner arc surface 31 and the second outer arc surface 121 are attached to each other, so as to improve the coaxiality of the second bearing chamber 33 of the second end cap 3 and the inner circular surface 14 of the stator 1; and the fastener 4 extends through the first mounting hole 24, the second mounting hole 132 and the third mounting hole 34, so that the first end cap 2, the stator 1 and the second end cap 3 are fixed to each other.

In an embodiment, the first mounting holes 24 and the second mounting holes 132 are unthreaded holes, the third mounting hole 34 is a threaded hole, and the fastener 4 is a threaded member. The fastener 4 presses the first end cap 2, the stator 1 and the second end cap 3 against each other and is threadedly connected with the second end cap 3.

In an embodiment, the first end cap 2 is in an interference fit with the first side iron core 11 by a press-in method or a temperature difference method. Press-in method includes following steps: the first inner arc surface 21 and the first outer arc surface 111 are cleaned, the first mounting holes 24 are aligned with the second mounting holes 132, the first inner arc surface 21 is aligned with the first outer arc surface 111, the first end cap 2 is tightly pressed on the stator 1 by press fitting from a ballast weight or an oil press device, and the first side iron core 11 of the stator 1 is pressed in a cylindrical cavity surrounded by the first inner arc surface 21. Temperature difference method includes following steps: the first inner arc surface 21 and the first outer arc surface 111 are cleaned, and the first end cap 2 is heated to expand moderately, the first end cap 2 is mounted to the stator 1 after expansion, so that the first mounting holes 24 are aligned with the second mounting holes 132; the first end cap 2 is shrunk after cooling, and the first end cap 2 is in an interference fit with the stator 1. The first end cap 2 may also be in an interference fit with the first side iron core 11 by a manual knocking method or a cold fitting method.

With reference to FIG. 2 and FIG. 3, it is provided with a plurality of second mounting holes 132 circumferentially distributing around a circle center of the middle iron core 13, so that distances from the circle centers of all second mounting holes 132 to the center of the middle iron core 13 are all equal, and the first mounting holes 24, the second mounting holes 132 and the third mounting hole 34 are aligned with each other, the coaxiality of the inner circular surface 14 of the stator 1 and the bearing chambers is further improved. In an embodiment, four second mounting holes 132 are provided, which are respectively formed in four corners of the middle iron core 13. The second mounting holes 132 do not extend through the first side iron core 11 and the second side iron core 12, which means that the second mounting holes are arranged in tangential circle places of the first side iron core 11 and the second side iron core 12, so that the first end cap 2 and the second end cap 3 are directly attached to surfaces of the middle iron core 13 and aligned with the mounting holes.

Figure 5:
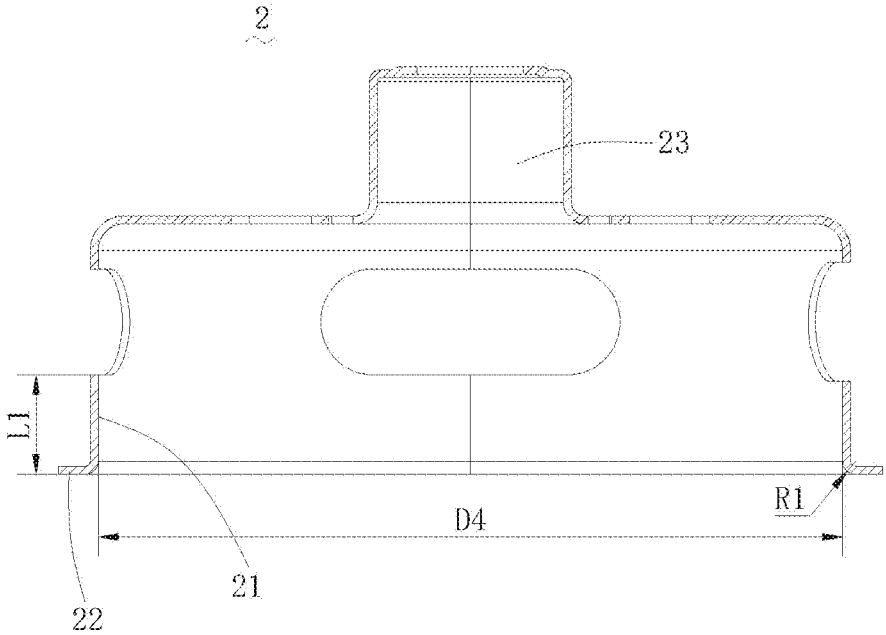
FIG. 5 is a cross-sectional view of a first end cap according to y an embodiment of the present application.

With reference to FIG. 5 and FIG. 6, in one of embodiments of the motor assembly structure, the first end cap 2 is provided with a first flange 22, the first flange 22 is formed by an end portion of the first inner arc surface 21 extending radially, and a surface of the first flange 22 is used for being tightly attached to one surface of the middle iron core 13. The first mounting holes 24 are formed in the first flange 22 to prevent the edge of the first end cap 2 from deforming when the fastener 4 is fastened. The second end cap 3 is provided with a second flange 32, the second flange 32 is formed by an end portion of the second inner arc surface 31 extending radially, and a surface of the second flange 32 is used for being tightly attached to the opposite surface of the middle iron core 13. The third mounting hole 34 is formed in the second flange 32 to prevent the edge of the second end cap 3 from deforming when the fastener 4 is fastened. In this way, compared with use of traditional cantilever screws in the front and rear end caps of the stator 1, the stator 1 supports both the front and rear end caps of the stator 1, which effectively reduces deformation of the edges of the end caps.

With reference to FIG. 2, in one of embodiments of the stator 1, distances from the circle centers of all second mounting holes 132 to the center of the middle iron core 13 are all equal. Since a space needs to be reserved for mounting the fastener 4 after the first end cap 2 and the second end cap 3 are mounted, a distance from the first mounting hole 24 to an outer wall of the first end cap 2 cannot be overly small, so that a distance from the circle center of the second mounting hole 132 to the adjacent first outer arc surface 111 cannot be overly small. A distance from a circle center of the second mounting hole 132 to the center of the middle iron core 13 is 0.5D3, the first outer arc surface 111 has a diameter d1, and (D3−d1)≥18 mm, so that enough mounting space for the fastener 4 is ensured. For example, D3−d1 is equal to 18 mm, 19 mm, 20 mm, and the like.

With reference to FIG. 2, in one of embodiments of the stator 1, the middle iron core 13 is provided with a third outer arc surface 131 at each corner of the middle iron core 13, and a circle center of the third outer arc surface 131 coincides with the center of the middle iron core 13, which means that an outer periphery of the middle iron core 13 is provided with a circumscribed tangent circle. The circumscribed tangent circle has a diameter d2, and the second mounting holes 132 has a diameter D2. A distance from an inner wall of the second mounting hole 132 to a surface of the circumscribed tangent circle of the middle iron core 13 should not be overly small, otherwise, an intensity at the circumscribed tangent circle may be overly low to bear a large torsional force and a large radial force, and resulting in a crack under stress. In order to ensure strengths at four corners of the middle iron core 13, d2−(D2+D3)≥2.2 mm, and d2−(D2+D3) may be 2.5 mm, 2.7 mm, 3 mm, and the like.

In another embodiment of the stator 1, each corner of the middle iron core 13 is provided with a chamfer, a distance between tangent lines of two chamfers at opposite corners of the middle iron core 13 is d2, and the second mounting holes has a diameter D2. Similarly, a distance from an inner wall of the second mounting hole 132 to a surface of the chamfer should not be overly small, otherwise, an intensity at the corner of the middle iron core 13 may be overly low to bear a large torsional force and a large radial force, and thus resulting in a crack under stress. In order to ensure strengths at four corners of the middle iron core 13, d2−(D2+D3)≥2.2 mm, and d2−(D2+D3) may be 2.5 mm, 2.7 mm, 3 mm, and the like.

With reference to FIG. 5, in one of embodiments of the first end cap 2, the first inner arc surface 21 has a depth L1 along an axial direction of the first inner arc surface, the first inner arc surface 21 has a diameter D4, and the first outer arc surface 111 has a diameter d1. In order to fit the first inner arc surface 21 with the first outer arc surface 111, D4=d1, but a tolerance zone of D4 is below a tolerance zone of d1. In the embodiment, the first side iron core 11 fully extends into the first end cap 2. In a condition that the thickness h1 of the first side iron core 11 is constant, the smaller the difference value between the depth L1 of the first inner arc surface 21 along the axial direction of the first inner arc surface and h1 is, the smaller the distance from the first side iron core 11 to heat dissipation holes in the first end cap 2 is. However, the heat dissipation holes are formed by punching, and materials around the heat dissipation holes may be deformed. If the distance from the first side iron core 11 to the heat dissipation hole is overly close, a fitting accuracy may be affected, and L1−h1≥10 mm, so that the first side iron core 11 has a certain distance from the heat dissipation hole after mounting, and thus the deformation of the edge of the heat dissipation hole is prevented from affecting the fitting accuracy.

With reference to FIG. 5, in one of embodiments of the first end cap 2, a joint between the first flange 22 and the first inner arc surface 21 is provided with a rounded chamfer. Since the first inner arc surface 21 is in an interference fit with the first outer arc surface 111, the arrangement of the rounded chamfer plays a guiding role in the assembly of the first end cap 2 and the stator 1, so that the edges won't be squeezed with each other and broken during assembly. A radius of the rounded chamfer above is R1. In the case of overly large R1, a fitting depth between the first inner arc surface 21 and the first outer arc surface is reduced correspondingly, which may lead to reduction of a reliability of interference fit, so that R1≤2 mm.

With reference to FIG. 6, in one of embodiments of the second end cap 3, the second inner arc surface 31 has a depth L2 along an axial direction of the second inner arc surface, the second inner arc surface 31 has a diameter D5, and the second outer arc surface 121 has a diameter d3. In order to fit the second inner arc surface 31 with the second outer arc surface 121, D5=d3, but a tolerance zone of D5 is above a tolerance zone of d1. In the embodiment, the second side iron core 12 fully extends into the second end cap 3. In a condition that the thickness h3 of the second side iron core 12 is constant, the smaller the difference value between the depth L2 of the first inner arc surface 21 along the axial direction of the first inner arc surface and h3 is, the smaller the mounting space for winding is. In order to ensure a mounting reliability of winding, L2−h3≥10 mm, so that there is an enough space between the second side iron core 12 and an end of the second inner arc surface 31 far away from the stator 1, where d3 is equal to d1.

With reference to FIG. 6, in one of embodiments of the second end cap 3, a joint between the second flange 32 and the second inner arc surface 31 is provided with a chamfer C having an axial depth less than or equal to 1 mm. Due to the clearance fit between the first inner arc surface 21 and the first outer arc surface 111, the arrangement of the chamfer plays a guiding role in the assembly of the second end cap 3 and the stator 1. However, an edge of the chamfer C is prismatic, and in a condition that the second end cap 3 is slightly misaligned with the stator 1, the second end cap 3 may not slip out of the stator 1 as is the case with the rounded chamfer, which is more convenient for mounting the second end cap 3.

With reference to FIG. 7, the present application provides a motor, and the motor includes the motor assembly structure in any one of the embodiments above, and further includes a rotor 5, and a first bearing 6 and a second bearing 7 which are respectively arranged at two ends of the rotor 5. The first bearing 6 and the second bearing 7 are both used for supporting the rotor 5, so that the rotor 5 rotates relative to the stator 1. The first bearing 6 is arranged in the first end cap 2 and the second bearing 7 is arranged in the second end cap 3. The first end cap 2 is correspondingly provided with a first bearing chamber 23, and the second end cap 3 is correspondingly provided with a second bearing chamber 33.

Through the positioning fit of the first side iron core 11 and the first end cap 2 and the positioning fit of the second side iron core 12 and the second end cap 3, the motor provided by the embodiment above with the motor assembly structure above can effectively improve the coaxiality of the stator 1 and the end caps, and thus improve the coaxiality of the stator 1 and a rotor 5, shorten an overall axial length of the motor, and reduce a length of the air gap between the rotor 5 and the stator 1.

In an embodiment, a method for assembling the motor in the embodiment above includes following steps, firstly, the first bearing 6 is placed in the first bearing chamber 23 of the first end cap 2, subsequently the first end cap 2 is in an interference fit with the first side iron core 11 of the stator 1, and subsequently the rotor 5 extends through the inner circular surface 14 of the stator 1 and is coaxially arranged with the inner circular surface 14 of the stator 1. Subsequently, the second bearing 7 is placed in the second bearing chamber 33 of the second end cap 3, and subsequently the second end cap 3 is assembled to the second side iron core 12 of the stator 1. The fastener 4 extends through the first end cap 2, the middle iron core 13 and the second end cap 3, so that the first end cap 2, the middle iron core 13 and the second end cap 3 are connected fixedly.

Those described above are only preferred embodiments of the present application, but are not intended to limit the present application. Any modifications, equivalent substitutions and improvements made without departing from the principle of the present application shall all fall within the scope of protection of the present application.

What is claimed is:

1. A motor assembly structure comprising:
a stator,
a first end cap and a second end cap arranged on respective sides of the stator, and
at least one fastener fastening the stator, the first end cap, and the second end cap,
wherein:
  the stator comprises:
    a middle iron core,
    a first side iron core disposed within the first end cap, and
    a second side iron core disposed within the second end cap,
  the first end cap has an inner edge with a first inner arc surface,
  the first side iron core has an outer edge with a first outer arc surface in an interference fit with the first inner arc surface,
  the second end cap has an inner edge with a second inner arc surface,
  the second side iron core has an outer edge with a second outer arc surface in a clearance fit with the second inner arc surface, and
  the fastener is disposed radially outward of the outer edges of the first and second side iron cores.

2. The motor assembly structure according to claim 1, wherein:
  the first side iron core has a thickness h1,
  the second side iron core has a thickness h3,
  h1≥5 mm, and
  h1≥h3.

3. The motor assembly structure according to claim 2, wherein:
  the first inner arc surface has a depth L1 along an axial direction of the first inner arc surface, and
  L1≥5 mm.

4. The motor assembly structure according to claim 1, wherein the middle iron core is polygonal.

5. The motor assembly structure according to claim 4, wherein:
  a circle center of the first outer arc surface coincides with a center of the first side iron core, and
  a circle center of the second outer arc surface coincides with a center of the second side iron core.

6. The motor assembly structure according to claim 4, wherein:
  a distance between two sides of the first side iron core is a1,
  the first outer arc surface has a diameter d1, and
  (a1/cos 20°)≥d1>a1.

7. The motor assembly structure according to claim 6, wherein:
  a distance between two sides of the second side iron core is a1, and
  the second outer arc surface has a diameter d3.

8. The motor assembly structure according to claim 6, wherein a distance between two sides of the middle iron core is equal to a1.

9. The motor assembly structure according to claim 1, wherein:
  the first end cap is provided with a plurality of first mounting holes,
  the middle iron core is provided with a plurality of second mounting holes at respective corners of the middle iron core,
  the second end cap is provided with a plurality of third mounting holes, and
  the fastener comprises a plurality of fasteners extending through the first mounting holes, the second mounting holes, and the third mounting holes.

10. The motor assembly structure according to claim 9, wherein:
  the first end cap is provided with a first flange abutting a surface of the middle iron core,
  the first flange extends outward from an end portion of the first inner arc surface at an angle to the first inner arc surface,
  the second end cap is provided with a second flange abutting a surface of the middle iron core,
  the second flange extends outward from an end portion of the second inner arc surface at an angle to the second inner arc surface,
  the first mounting holes are formed in the first flange, and
  the second mounting holes are formed in the second flange.

11. The motor assembly structure according to claim 9, wherein:
  a diameter of a circle connecting the second mounting holes is D3;
  a distance from a center of the circle connecting the second mounting holes to a center of the middle iron core is 0.5D3,
  the first outer arc surface has a diameter d1, and
  (D3−d1)≥18 mm.

12. The motor assembly structure according to claim 9, wherein:
  a diameter of a circle connecting the second mounting holes is D3;
  the middle iron core has a third outer arc surface at each corner of the middle iron core,

US 12,676,516 B2

13 a circle center of the third outer arc surface coincides with a center of the middle iron core,
the third outer arc surface has a diameter d2,
the second mounting holes have a diameter D2,
a distance from a circle center of the second mounting holes to the center of the middle iron core is 0.5D3, and d2−(D2+D3)≥2.2 mm.

13. The motor assembly structure according to claim 9, wherein;
a diameter of a circle connecting the second mounting holes is D3;
the middle iron core is provided with a chamfer at each corner of the middle iron core,
a distance between tangent lines of two chamfers at opposite corners of the middle iron core is d2,
the second mounting holes have a diameter D2,
a distance from a circle center of the second mounting holes to the center of the middle iron core is 0.5D3, and d2−(D2+D3)≥2.2 mm.

14. The motor assembly structure according to claim 10, wherein:
the first inner arc surface has a depth L1 along an axial direction of the first inner arc surface,
the first inner arc surface has a diameter D4,
the first outer arc surface has a diameter d1, the first side iron core has a thickness h1,
D4=d1, and
L1−h1≥10 mm.

15. The motor assembly structure according to claim 14, wherein a joint between the first flange and the first inner arc surface is provided with a rounded chamfer having a radius less than 2 mm.

16. The motor assembly structure according to claim 10, wherein:
the second inner arc surface has a depth L2 along an axial direction of the second inner arc surface,
the second inner arc surface has a diameter D5,
the second outer arc surface has a diameter d3,
the second side iron core has a thickness h3,
D5=d3, and
L2−h3≥10 mm.

17. The motor assembly structure according to claim 16, wherein a transition between the second flange and the second inner arc surface includes a chamfer having an axial depth less than or equal to 1 mm.

18. The motor assembly structure according to claim 1, wherein:
the first end cap is provided with a first bearing chamber at a side of the first end cap away from the stator,

the second end cap is provided with a second bearing chamber at a side of the second end cap away from the stator, and
the first bearing chamber, the second bearing chamber, and an inner circular surface of the stator are coaxially arranged.

19. A motor comprising:
the motor assembly structure according to claim 1,
a rotor, and
a first bearing and a second bearing arranged at respective ends of the rotor,
wherein the first bearing is arranged in the first end cap and the second bearing is arranged in the second end cap.

20. A motor assembly structure comprising:
a stator,
a first end cap and a second end cap arranged on respective sides of the stator, and
at least one fastener fastening the stator, the first end cap, and the second end cap,
wherein:
the stator comprises:
a middle iron core,
a first side iron core disposed within the first end cap, and
a second side iron core disposed within the second end cap,
the first end cap has an inner edge with a first inner arc surface and an end portion extending radially outward of the first inner arc surface to form a first flange,
the first side iron core has an outer edge with a first outer arc surface in an interference fit with the first inner arc surface,
the second end cap has an inner edge with a second inner arc surface and an end portion extending radially outward of the second inner arc surface to form a second flange,
the second side iron core has an outer edge with a second outer arc surface in a clearance fit with the second inner arc surface,
the fastener is disposed radially outward of the outer edges of the first and second side iron cores when fastening the stator, first end cap and second end cap, and
the fastener extends through the first and second flanges and the middle iron core.

* * * * *